US012790475B2

(12) United States Patent
Shadkam et al.

(10) Patent No.: US 12,790,475 B2
(45) Date of Patent: Nov. 10, 2026

(54) UPCYCLING POST-CONSUMED SINGLE USED PAPER CUPS TO LOOSE FIBRE INSULATION AND PAPER-PLASTIC COMPOSITE MATERIAL

(71) Applicant: DMH Products Inc., Vancouver (CA)

(72) Inventors: Ashkan Shadkam, Vancouver (CA); Reza Korehei, Vancouver (CA)

(73) Assignee: DMH Products Inc., Vancouver (CA)

( * ) Notice: Subject to any disclaimer, the term of this patent is extended or adjusted under 35 U.S.C. 154(b) by 698 days.

(21) Appl. No.: 18/332,245

(22) Filed: Jun. 9, 2023

(65) Prior Publication Data

US 2024/0247141 A1 Jul. 25, 2024

Related U.S. Application Data

(60) Provisional application No. 63/481,205, filed on Jan. 24, 2023.

(51) Int. Cl.

| | |
|---|---|
| ***C08L 23/12*** | (2006.01) |
| ***B29C 48/00*** | (2019.01) |
| ***B29C 48/88*** | (2019.01) |
| ***B29K 23/00*** | (2006.01) |
| ***B29K 105/12*** | (2006.01) |
| ***B29K 105/26*** | (2006.01) |
| ***B29K 201/00*** | (2006.01) |
| ***C08K 3/38*** | (2006.01) |
| ***C08K 5/098*** | (2006.01) |
| ***C08K 5/1539*** | (2006.01) |
| ***C08K 5/20*** | (2006.01) |
| ***C08K 5/523*** | (2006.01) |
| ***C08K 13/02*** | (2006.01) |
| ***D21B 1/10*** | (2006.01) |
| ***D21B 1/14*** | (2006.01) |

(52) U.S. Cl.

CPC .......... *C08L 23/12* (2013.01); *B29C 48/0011* (2019.02); *B29C 48/022* (2019.02); *B29C 48/911* (2019.02); *C08K 13/02* (2013.01); *D21B 1/10* (2013.01); *D21B 1/14* (2013.01); *B29K 2023/065* (2013.01); *B29K 2105/12* (2013.01); *B29K 2105/26* (2013.01); *B29K 2201/00* (2013.01); *C08K 2003/387* (2013.01); *C08K 5/098* (2013.01); *C08K 5/1539* (2013.01); *C08K 5/20* (2013.01); *C08K 5/523* (2013.01); *C08K 2201/014* (2013.01); *C08L 2201/02* (2013.01); *C08L 2205/035* (2013.01); *C08L 2205/06* (2013.01); *C08L 2205/16* (2013.01); *C08L 2207/062* (2013.01); *C08L 2207/20* (2013.01)

(58) Field of Classification Search

CPC ............... C08L 23/12; C08L 2207/062; C08L 2205/16; C08L 2207/20; C08L 2205/035; C08L 2201/02; C08L 2205/06; C08K 5/1539; C08K 5/098; C08K 5/20; C08K 5/523; C08K 2003/387; C08K 2201/014; B29C 48/0011; B29C 48/022; B29C 48/911; B29K 2201/00; B29K 2023/065; B29K 2105/12; B29K 2105/26; D21B 1/10; D21B 1/14

See application file for complete search history.

(56) References Cited

FOREIGN PATENT DOCUMENTS

WO WO-2020139374 A1 * 7/2020 ............. D21H 27/34

* cited by examiner

*Primary Examiner* — Patrick D Niland

(74) *Attorney, Agent, or Firm* — Michael R Williams; Ryan W Depris; Ade & Company Inc.

(57) ABSTRACT

Described herein is a method for upcycling single use paper cups into value-added products such as loose fibre insulation as well as paper-plastic composite materials which can be tailored to be used for example as construction products such as flooring, decking, siding or cabinet films. This recycling-based technology reduces dependence on petroleum-based materials such as plastic resins for example, for production of flooring, decking and siding of wood-plastic composites with employing recycled paper cup content in composite materials.

12 Claims, No Drawings

UPCYCLING POST-CONSUMED SINGLE USED PAPER CUPS TO LOOSE FIBRE INSULATION AND PAPER-PLASTIC COMPOSITE MATERIAL

PRIOR APPLICATION INFORMATION

The instant application claims the benefit of U.S. Provisional Patent Application 63/481,205, filed Jan. 24, 2023 and entitled "Upcycling post-consumed single used paper cups to loose fibre insulation and paper-plastic composite material", the entire contents of which is incorporated herein by reference for all purposes.

Keywords: Recycling, Waste paper cups, Dry refining, loose fiber, insulation, paper-plastic composite, Recycled plastic.

BACKGROUND OF THE INVENTION

Estimates from the paper and recycling sectors suggest that between 600,000 to 800,000 tons of single-use paper cups are consumed annually in the U.S. and Canada combined. This suggests the consumption of more than 50 billion single-use cups annually in North America. Currently, major paper cup waste is not recycled as most cups end up in landfill. Since single-used paper cups have a polyethylene lining, the cups are not easily recycled to paper fiber and the sheer volume of this waste in landfill contributes to micro-plastic pollution of soil and water resources. It is noteworthy that there is not a lot of interest in the re-pulping and recycling of used paper coffee cups due to technical difficulties caused by the polymer lining. Specifically, there is strong bonding between low-density polyethylene (with a molecular weight of 30,000 to 50,000 g/mol) as plastic liner (8-10% by weight) and virgin cellulose paper fiber, usually hard wood craft pulp fiber (90-92% by weight).

The actual composition of paper cups does not vary considerably as the majority are at least 90 percent paper fiber, with the remaining 10% being low density polyethylene (PE) plastic.

SUMMARY OF THE INVENTION

According to an aspect of the invention, there is provided a quantity of recycled fibers prepared from single-use cups, said recycled fibers comprising a fine percentage of 6.0-8.5%, a mean length of 0.675-9.50 mm and a curl index of 0.9-1.2.

According to another aspect of the invention, there is provided a mixture comprising:

81-87% w/w of a matrix component, wherein the matrix component comprises 10-90% recycled fibers as described above and 10-90% recycled paper.

According to another aspect of the invention, there is provided use of the above-described mixture as a loose fill insulation product.

According to another aspect of the invention, there is provided a mixture comprising:

about 90 to about 92% w/w matrix component, wherein the matrix component comprises about 50 to about 100% thermoplastic polymer and about 0 to about 50% recycled fibers as described above;

about 2.5 to about 3.5% w/w coupling agent; and about 2.5 to about 3.5% w/w lubricant.

The mixture may further comprise:

about 1.0% w/w antioxidant/biocides; and about 1.0% w/w flame retardant.

The mixture may further comprise:

about 0.5% w/w smell absorbent; and about 0.5% w/w fragrance.

According to another aspect of the invention, there is provided a method of preparing an extruded product comprising:

mechanically mixing the mixture as described above;

preheating the mixture;

extruding the mixture, thereby providing an extruded material;

collecting the extruded material and then hot pressing the extruded material to desired thickness; and slow cooling down the pressed material to room temperature.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a method for upcycling single use paper cups into value-added products such as, for example, but by no means limited to loose fibre insulation as well as paper-plastic composite materials which can be tailored to be used for example as construction products such as flooring, decking, siding or cabinet films.

As discussed herein, this recycling-based technology reduces dependence on petroleum-based materials such as plastic resins for example, for production of flooring, decking and siding of wood-plastic composites with employing recycled paper cup content in composite materials.

Specifically, herein is presented a process of producing two specific recycled construction products (paper-plastic composite and loose fiber insulation material) from single use paper cup waste, preferably used single use paper cups. As discussed herein, dry refined single used paper cups are combined with other components such as for example recycled high density polyethylene, lubricant, fire retardant, recycled paper, and other chemical additives. As discussed herein, the key parameter is to select suitable chemical additives that provide a high-quality product. As will be appreciated by those of skill in the art, due diligence is required to select these suitable components, as is an understanding of all of the parameters. Specifically, selecting suitable chemical additives is the main key parameter for creating a good bonding between fiber-plastic and fiber-fiber components. As will be apparent to those of skill in the art, addition of suitable chemical additives provides desired properties such as for example but by no means limited to fire resistance, anti-mold properties, higher dimensional stability and enhanced insulation properties, as discussed herein.

Research Methodology

As described herein, experimental research work is divided in two parts, based on the final product application.

As discussed below, in a first embodiment of the invention, paper cups are shredded and highly refined in the dry mode. For the first product application as "loose fiber insulation material", the highly refined paper cups are mixed with chemical additives in a dry mixing process.

As discussed below, in a second embodiment of the invention, a "paper-plastic composite", is prepared. As discussed herein, this process requires the selection of a suitable resin, fiber and other chemical additives for the formulation. In the case of a paper-plastic composite used for decking or siding products, considerations are selecting a suitable resin, for example, a suitable resin source, for example, a suitable recycled resin or suitable recycled resin source, suitable chemicals additives, the proper mixing ratio of the components and employing and/or incorporating other green alternative sources such as paper cups into the formulation.

According to an aspect of the invention, there is provided a quantity of recycled fibers prepared from single-use cups, said recycled fibers comprising a fine percentage of 6.0-8.5%, a mean length of 0.675-9.50 mm and a curl index of 0.9-1.2. In some embodiments, the fine percentage is about 7.25%, the mean length is about 0.814 mm and the curl index is about 1.05, wherein about indicates plus or minus up to 15% of the base value. In other embodiments, the fine percentage is 7.25%, the mean length of the fibers is 0.814 mm and the curl index of the fibers is 1.05.

In some embodiments of the invention, the recycled fibers are prepared from single use paper cups that have been refined in dry mode using for example high consistency refining machinery, as discussed below.

In some embodiments of the invention, prior to refinement, the single use paper cups are cut into pieces that are approximately postage stamp-sized. As known by those of skill in the art, postage stamps typically have a size of about 0.85" to about 1.3" wide and about 0.95" to about 1.65" tall where "about" refers to plus or minus up to 15% of the base value.

In some embodiments of the invention, the cut-up pieces are sprayed or otherwise mixed with water to make a feed moisture ratio of 8-12% or about 10% by weight water (plus or minus 15%) or 10% by weight water and subsequently fed into the (HC) refiner, as discussed below.

These recycled fibers can then be used in one or more mixtures or formulations of the invention.

In some embodiments of the invention, there is provided a mixture comprising:

- 83-87% w/w of a matrix component, wherein the matrix component comprises 10-90% recycled paper cups as described above and 10-90% recycled paper;
- 0.5-1.5% w/w of an antifungal and/or antimicrobial agent;
- 3-18% of at least one fire retardant composition; and
- 0.5-1.5% w/w of a smell absorbent.

In some embodiments of the invention, the antifungal and/or antimicrobial agent is a mixture of undecylenic acid and mineral oil. In some embodiments of the invention, the antifungal and/or antimicrobial agent is a mixture of about 50% w/w undecylenic acid and about 50% mineral oil, wherein "about" indicates plus or minus up to 15% of the base value. In some embodiments of the invention, the antifungal and/or antimicrobial agent is a mixture of 50% undecylenic acid and 50% mineral oil.

In some embodiments of the invention, the at least one fire retardant is zinc borate or mono potassium phosphate. In some embodiments of the invention, the zinc borate is added at 3-7% w/w and the mono potassium phosphate is added at 5-11% w/w. In other embodiments, there are at least two fire retardants, for example, two fire retardants, present in the mixture: zinc borate added at 3-7% w/w and mono potassium phosphate added at 5-11% w/w.

In some embodiments of the invention, the smell absorbent is one or more cyclodextrins.

In some embodiments of the invention, the mixture as described above is used as a loose fill insulation product.

In another embodiment of the invention, there is provided a mixture comprising:

- about 90 to about 92% w/w matrix component, wherein the matrix component comprises about 50 to about 100% thermoplastic polymer and about 0 to about 50% recycled fibers, prepared as described above;
- about 2.5 to about 3.5% w/w coupling agent; and
- about 2.5 to about 3.5% w/w lubricant.

In some embodiments, the mixture may further comprise one or more of: about 1.0% w/w antioxidant/biocides; about 1.0% w/w flame retardant; about 0.5% w/w smell absorbent; and about 0.5% w/w fragrance.

As used herein, "about" indicates "plus or minus up to 15% of the base value" unless otherwise indicated.

In some embodiments, the matrix is about 50 to about 90% thermoplastic polymer and about 10 to about 50% recycled fibers.

In other embodiments, the matrix is about 70 to about 90% thermoplastic polymer and about 10 to about 30% recycled fibers.

In other embodiments, the matrix is 50 to 90% thermoplastic polymer and 10 to 50% recycled fibers, or the matrix is 70 to 90% thermoplastic polymer and 10 to 30% recycled fibers.

In some embodiments, the thermoplastic polymer is a waste thermoplastic polymer

The thermoplastic polymer may be HDPE.

In some embodiments, the coupling agent is a mixture of PE-grafted maleic anhydride and maleic anhydride, for example, an about 50:about 50 blend of PE-grafted maleic anhydride and maleic anhydride, or, a 50:50 blend of PE-grafted maleic anhydride and maleic anhydride.

In some embodiments, the lubricant is magnesium stearate and/or ethylene bis stearamide, for example, an about 50:about 50 blend of magnesium stearate and ethylene bis stearamide, or a 50:50 blend of Mg stearate and Ethylene bis stearamide.

In some embodiments, the antioxidant/biocides comprise zinc undecylenate and/or lactic acid. For example, the antioxidant/biocides may be an about 50 to about 50 mix of zinc undecylenate and lactic acid or a 50:50 mix of zinc undecylenate and lactic acid.

In some embodiments, the flame retardant comprises a mix of triphenyl phosphate and zinc borate. For example, the flame retardant may be a mix of about 50 of triphenyl phosphate and to about 50 zinc borate or a 50:50 mix of triphenyl phosphate and zinc borate.

In some embodiments, the smell absorbent is a cyclodextrin, for example, hydroxypropyl-β-cyclodextrin.

As will be appreciated by one of skill in the art, any suitable fragrance known in the art may be used within the invention.

According to another aspect of the invention, there is provided a method of preparing an extruded product comprising: mechanically mixing the mixture described above; preheating the mixture; extruding the mixture, thereby providing an extruded material; collecting the extruded material and then hot pressing the extruded material to desired thickness; and slow cooling down the pressed material to room temperature.

The mixture may be preheated in an oven at 100° C. for 10 min.

The mixture may be extruded at 160° C.

As discussed herein, the above-described provides all required standard characteristic such as acceptable mechanical properties, good durability, low moisture absorption, lack of microbial and UV degradation and furthermore provides high fire-resistant property for the loose-fiber insulation product.

As will be apparent to those of skill in the art, the paper cup based recycled fibers are not being pulped or re-pulped in the method of the invention. Rather, the paper cups are being refined in dry mode using for example high consistency refining machinery, as discussed below.

The invention will now be further explained and/or elucidated by way of example; however, the invention is not necessarily limited to or by the examples.

Example 1—Shredding and Dry Refining Process and Characterization of Post Consumed Paper Cups In this example, Amazon Basics 12 oz. polyethylene-lined paper cups were obtained from Amazon's online store. However, as will be appreciated by one of skill in the art, any suitable single-use paper cups may be used within the invention. Initial dry refining process tests were performed using high consistency (HC) refiner machine. Before refining, the cups were shredded down to postage stamp sized pieces to fit through the feed of the machine by cutting up the cups manually. As is known to those of skill in the art, postage stamps typically have a size of about 0.85" to about 1.3" wide and about 0.95" to about 1.65" tall where "about" refers to plus or minus up to 15% of the base value. The cut-up pieces were then placed in a large bucket and then sprayed with water to make a feed moisture ratio of 8-12% or about 10% by weight water and subsequently fed into the (HC) refiner. The 10% moisture does not allow the plastic liner to tear off the paper easily, which would clog the refining plate. This mixture was then fed into the HC refiner taking care to not overflow the feed, thereby ensuring a constant output of refined paper. In this example, the material was run through the refiner twice. Table 1 summarizes the HC refining settings for this machine. As will be apparent to one of skill in the art, the settings on the dry refiner can be varied ±15% for the same results and any standard HC dry refiner shall produce similar results with our parameters used here (Table 1).

TABLE 1

| Characteristics of dry refining parameters used in this study Pass 1 |
|---|
| 30-50 Hz |
| Screw feed 35-50 |
| No load power - 1.7-2.0 |
| Total Power - 1.77-2.0 |
| Dry content 75 to 95% |
| 2.5 mm gap |

To further complete the refining process and to produce highly refined paper cups, the high consistency refined paper cups were then added to Waring Laboratory Refiner (commercial equipment). The 1 L, 120 V model Waring laboratory refiner was used for further dry refining process. This dry refiner is equipped with stainless steel blade in single-speed (18,000 rpm) with a 0.40 hp motor. This dry refining step was performed for 5 min on each batch and every batch contains 250 g of previously refined paper cups from the high consistency machine. As will be apparent to one of skill in the art, use of any device or machine or combination of devices and/or machines that can be configured to produce an end product with similar properties is within the scope of the invention.

Table 2 presents characteristics of highly refined paper cups obtained and characterized in this study. Data for hard and softwood is from the literature. Dry refining enhances physical property of paper cups fibers with the most important effects being as follows: cutting and shortening of fibers, complete removal of parts from fiber walls, extra fibrillation, increase surface area and thus possibility of attachment of bonding of functional groups to fibres. Dry mechanical refining increases the area of contact between the fibers by increasing their surface through fibrillation process. These mechanical forces cause several changes in fibers: removal of primary wall, delamination and swelling of the secondary wall that improves fiber flexibility, and peeling off the fibrils from the fiber surface (external fibrillation). Such peeling improves the potential bonding area and producing edges that may act as bonding bridges at inter-fiber contacts.

TABLE 2

Comparing fiber properties of recycled material with other fiber sources

| | Sample | Fine % | Mean length, mm | Curl Index |
|---|---|---|---|---|
| Paper Cups | Recycled fibers | 7.25 | 0.814 | 0.105 |
| Hardwood | Eucalyptus | 3.54 | 0.744 | 0.103 |
| Softwood | pine | 2.47 | 2.571 | 0.137 |

Example 2—Loose Fiber Insulation Application from Recycled Paper Cups

In this example, we report the production and formulation of the loose fiber insulation product from waste paper cups. This loose fiber insulation material with a unique formulation has high amounts of recycled material including higher percentages of biobased materials (cellulosic materials) content for spray and blown-in insulation.

For Spray or blown-in insulation products (i.e. dry process), cellulose paper insulation is a fairly simple material produced from one of our biggest solid-waste products, newspapers. All cellulose insulation manufacturers in North America purchase old newspapers collected through recycling programs. However, here we report producing cellulose paper insulation from recycled single used paper cups materials for the first time.

There are two stages in our production.

In the first stage, cleaned and dried paper cups are shredded into pieces.

In the second stage, or finishing mill, which is known as "fiberization", we use the dry refining process and high-pressure air to disaggregate materials back into individual fibers. In the fiberization process, high-pressure air is used to blow particles apart, to create a fluffy product that looks like the padding used in disposable diapers. Fiberization produces lower-density cellulose/plastic with several advantages. Once the paper cups have been adequately shredded, chemicals (Table 3) are added to provide fire-retarding and mold-inhibiting properties to the insulation. The most common chemicals used today are boric acid and ammonium sulfate.

As will be apparent to those of skill in the art, the cellulose, for example, the recycled newspaper is also shredded and refined prior to use in the formulations of the invention.

However, in our formulation, the materials we have used are different and modified formulation which provides class A insulation for building use is presented. In our unique formulation, a suitable mineral oil is used as a binder and as an anti micro-organism material for the final insulation product, as discussed above.

The described chemical formulation has the advantage of not only providing fire retardancy, but adds mold, insect, and rodent resistance to the insulation. After the insulation is mixed with fire-retardant chemicals and a low percentage of binders, it could be bagged and shipped to building supply outlets or installers.

As discussed herein, the loose fiber insulation is a mixture made of recycled paper and recycled paper cups and provides excellent insulation material for the building envelope.

It can also be applied as a complement to other existing insulation in attics. In these embodiments, this loose fiber insulation material is blown with pneumatic blowing equipment or can be manually applied in restricted spaces.

In other embodiments, the loose-fill version of cellulose (recycled paper and paper cups) can be blown into wall or attic cavities with the use of suitable blowing machines. The tiny particles of the recycled paper cup fiber form an effective insulating material, which conforms to most structures and spaces without disturbing or dislocating the finish. This mixture of cellulose loose fiber insulation (waste paper and used paper cups) could also make homes more soundproof than before. It has a high heat resistant value, which essentially means that it can effectively resist heat flow to keephouses warm during winters and cool during the summer.

There are three primary types of this loose fiber insulation application which include:

1) Loose-Fill application more for attic insulation;
2) Dense-Packed application more as wall cavity insulation material; and
3) Wet-Spray application which is more for application such as parkade insulation application and/or suspended ceiling using water and adhesive for better adhering property.

TABLE 3

Formulation and detailed additive chemistry for our loose fiber insulation product made from mixture of either recycled waste paper or recycled paper cups

| Function property | Materials/additives | Dosage wt. % |
|---|---|---|
| Matrix component | Recycled Paper Cups (10 wt. %-90 wt. %) | Total of 85 wt. % |
| Matrix component | Recycled Paper (10 wt. %-90 wt. %) | Range (83-87 wt %) |
| Antifungal and antimicrobial agent | Undecylenic acid/ Mineral oil (50 wt. %-wt. 50%) | 1 wt. % Range (0.5-1.5 wt %) |
| Fire retardant #1 | Zinc Borate | 5 wt. % Range (3-7 wt %) |
| Fire retardant #2 | Mono potassium phosphate | 8 wt. % Range (5-11 wt %) |
| Smell absorbent | Cyclodextrins | 1 wt. % Range (0.5-1.5 wt %) |

Example 3—Composite Materials from Recycled Paper Cups and Recycled High Density Polyethylene (HDPE)

In this embodiment, waste disposable paper cups are upcycled by making a composite material with a suitable virgin or waste thermoplastic polymer, for example but by no means limited to high density polyethylene (HDPE) in either virgin/waste form. Specifically, as discussed in greater detail below, any thermoplastic polymer with a known melting point can be used within the invention.

This product can be used as composite decking material or architectural film in cabinets, as two examples. Similar composite materials have been investigated using other cellulose fibers from a range of natural materials including flax and hemp and other fibers from agricultural residues. In this study, the production of composites has been investigated as a way to also recycle waste thermoplastic polymers, of which HDPE plastics are one example, which are further reinforced with recycled paper cups fiber. A key finding from this study is that the different chemical nature of cellulose fibers from recycled paper cups and waste plastic polymer matrices means that the interfacial strength tends to be poor unless a suitable mixture of coupling agent, lubricant and other chemical additives is used in right ratio.

To our knowledge, the production of composite materials made of recycled HDPE reinforced with highly refined waste paper cups have not previously been reported. In our process, a three-stage process including material premixing, extrusion and compression molding is employed to produce paper-plastic composite material by employing a suitable combination of matrix and other chemical additives, a fine dispersion of highly refined paper cup fibers in waste thermoplastic polymer, in this example, HDPE plastic matrix was obtained. The recycled paper cup fibers have a cylindrical shape with a curl index of 1.05, as discussed above. The obtained sample composites were then visually inspected, and tooling process of final product including drilling and cutting were examined. The optimal physical processing parameters including processing temperature, mixing time, rotating speed and chemical combination were all studied at this lab scale processing.

The stability of recycled paper cup cellulose fiber during high temperature composite processing has also been examined. Disposable paper cups consisting of high-quality cellulose fibers with a polyethylene coating were obtained from a major supplier (Uline, Canada). The waste HDPE extracted from two different sources (Blue Planet Plastic Recycling, Canada and Kingspan oil storage tanks, UK) were used in all mixtures. Both waste plastics showed a melting point temperature of 130° C.

In this example, a mixture of Maleic anhydride and Maleic anhydride grafted polyethylene (MA-g-PE) was used as the coupling agent (Sigma-Aldrich chemicals), although other suitable coupling agents may be used in the formulation and are within the scope of the invention. All other additive chemicals (listed in Table 4) were purchased from Sigma-Aldrich chemicals and used as it is. The disposable paper cups were initially shredded and then highly refined as it was explained previously. The mix designs of the polyethylene flakes and waste paper cups composites are shown in Table 4. In this table, the amount of coupling agent and lubricant were increased as the content of recycled paper cups increased to facilitate the mixing and extrusion process. Batches of high-density polyethylene pellets, refined paper cup fiber and other chemical additive were heated in oven at 100° C. and mixed for 10 min to form a uniform feed mixture using lab mixer prior to extrusion process. Mixtures subsequently underwent a two-stage extrusion and hot press molding process. Laboratory semi-pilot extruder (Bonnot company) was used as a co-rotating twin screw extruder with an L/D ratio of 40:1. The heating temperature varied from 140° ° C. to 160° ° C. between the feeding zone and the die head. The screw speed was set at 240 rpm and final extrudate materials were collected on stainless steel metal disk and hot pressed to desire thickness. The specimens were then cut to rectangular shape as well as dogbone tensile shape for further physical and mechanical testing and characterization.

Our lab work process in this example involved in the following steps:

1. Mechanical mixing of all components
2. Preheat the components in oven at 100° C. for 10 min
3. Introduce the mixture to hopper followed by extrusion at 160° C.
4. Collect the extruded material on hot plate followed by hot pressing to desired thickness
5. Slow cooling down to room temperature
6. Cut the sample to standard shape (in this example, dogbone shape ASTM D638)
7. This dogbone shape allows us to measure tensile according to ASTM D638

TABLE 4

The chemistry recipe for the paper-plastic composite from HDPE and recycled paper cup

| Function property | Materials/additives | Dosage wt. % | Dosage wt. % | Dosage wt. % | Dosage wt. % |
|---|---|---|---|---|---|
| Matrix component | Recycled Polyolefin (HDPE) | HDPE:Re-cycled | HDPE:Re-cycled | HDPE:Re-cycled | HDPE:Re-cycled |
| Matrix component | Recycled Paper cups (RPC) | Paper cup (100%:0%) 92 wt. % | Paper Cup (90%:10%) 92 wt. % | Paper Cup (80%:20%) 91 wt. % | Paper Cup (70%:30%) 90 wt. % |
| Coupling agent | PE-grafted-Maleic Anhydride. and Maleic Anhydride. (50:50 blend) | 2.5 wt. % | 2.5 wt. % | 3.0 wt. % | 3.5 wt. % |
| Lubricant | Mg Stearate. and Ethylene bis Stearamide. (50:50 blend) | 2.5 wt. % | 2.5 wt. % | 3.0 wt. % | 3.5 wt. % |
| Antioxidant biocides | Zn undecylenate. and Lactic acid. (50:50 blend) | 1.0 wt. % | 1.0 wt. % | 1.0 wt. % | 1.0 wt. % |
| Flame retardant | Triphenyl Phosphate. and zinc borate. (50:50 blend) | 1.0 wt. % | 1.0 wt. % | 1.0 wt. % | 1.0 wt. % |
| Smell absorbent | Hydroxypropyl-β-cyclodextrin | 0.5 wt. % | 0.5 wt. % | 0.5 wt. % | 0.5 wt. % |
| Fragrance | Any fragrance | 0.5 wt. % | 0.5 wt. % | 0.5 wt. % | 0.5 wt. % |

In this example, our experiments include highly refined recycled paper cups fiber as the reinforcement material for HDPE plastic. It was found that the manufacturing process could incorporate at least 30 wt. % of highly refined paper cups fiber in the matrix of HDPE plastic. Higher additions may be possible to be achieved with improved processing facilities, for example, up to 50% recycled paper cup content in our paper-plastic composite. The coupling agents employed in this study were used to bond maleic anhydride to the hydroxyl groups of cellulosic fibers of refined paper cups fibers. The polyethylene grafted to the maleic anhydride interlocks with the HDPE plastic matrix, creating a stronger bond between the paper cups fiber and HDPE plastic matrix. The experiments have shown that 3 to 3.5 wt. % addition of coupling agent is optimal at the highest volume fraction within this research. The application of other additives such as lubricant, antioxidant, flame retardant, smell absorbent and fragrance were to facilitate extrusion process, decrease UV and rate of degradation time, enhance fire resistant property and to provide pleasant smell to final product. The composites made from HDPE and highly refined waste paper cups could be used in many applications where enhanced stiffness is required in molded or extruded products. They would be particularly useful as siding products, decking products for home and lightweight construction application.

While the preferred embodiments of the invention have been described above, it will be recognized and understood that various modifications may be made therein, and the appended claims are intended to cover all such modifications which may fall within the spirit and scope of the invention.

The invention claimed is:

1. A mixture comprising:

about 90 to about 92% w/w matrix component, wherein the matrix component comprises about 50 to about 100% thermoplastic polymer and about 0 to about 50% recycled fibers prepared from single-use cups, said recycled fibers comprising a fine percentage of 6.0-8.5%, a mean length of 0.675-9.50 mm and a curl index of 0.9-1.2;

about 2.5 to about 3.5% w/w coupling agent; and about 2.5 to about 3.5% w/w lubricant.

2. The mixture according to claim 1 wherein the matrix is about 50 to about 90% thermoplastic polymer and about 10% to about 50% recycled fibers.

3. The mixture according to claim 1 wherein the matrix is about 70 to about 90% thermoplastic polymer and about 10% to about 30% recycled fibers.

4. The mixture according to claim 1 wherein the thermoplastic polymer is waste thermoplastic polymer.

5. The mixture according to claim 1 wherein the thermoplastic polymer is high density polyethylene (HDPE).

6. The mixture according to claim 1 wherein the coupling agent is a mixture of PE-grafted maleic anhydride and maleic anhydride.

7. The mixture according to claim 1 wherein the coupling agent is an about 50: about 50 blend of PE-grafted maleic anhydride and maleic anhydride.

8. The mixture according to claim 1 wherein the lubricant is magnesium stearate and/or ethylene bis stearamide.

9. The mixture according to claim 1 wherein the lubricant is an about 50: about 50 blend of magnesium stearate and Ethylene bis stearamide.

10. An extruded product comprising the mixture of claim 1, said extruded product prepared by:

mechanically mixing the mixture;

preheating the mixture;

extruding the mixture, thereby providing an extruded material;

collecting the extruded material and then hot pressing the extruded material to desired thickness; and slow cooling down the pressed material to room temperature.

11. The extruded product according to claim 10 wherein the mixture is preheated in an oven at 100° C. for 10 min.

12. The extruded product according to claim 9 wherein the mixture is extruded at 160° C.

* * * * *